United States Patent
Chang

(10) Patent No.: US 8,054,621 B2
(45) Date of Patent: Nov. 8, 2011

(54) HARDWARE FASTENING STRUCTURE FOR COMPUTER

(75) Inventor: Chin-Ming Chang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 177 days.

(21) Appl. No.: 12/610,350

(22) Filed: Nov. 2, 2009

(65) Prior Publication Data

US 2011/0031362 A1 Feb. 10, 2011

(30) Foreign Application Priority Data

Aug. 7, 2009 (CN) .......................... 2009 1 0305390

(51) Int. Cl.
G06F 1/16 (2006.01)
H05K 5/00 (2006.01)
H05K 7/00 (2006.01)

(52) U.S. Cl. ......... 361/679.37; 361/679.33; 361/679.39; 361/679.38; 248/918; 248/221.11; 248/27.1

(58) Field of Classification Search ............. 361/679.31, 361/679.33, 679.37, 679.39; 248/694, 918, 248/221.11, 222.11, 225.21, 27.1, 27.3; 292/42, 292/162, 145, 150

See application file for complete search history.

(56) References Cited

U.S. PATENT DOCUMENTS

| | | | | |
|---|---|---|---|---|
| 6,018,457 A * | 1/2000 | Mroz | ........................ | 361/679.31 |
| 6,538,879 B2 * | 3/2003 | Jiang | .......................... | 361/679.6 |
| 6,882,527 B2 * | 4/2005 | Wang et al. | .............. | 361/679.31 |
| 7,035,099 B2 * | 4/2006 | Wu | ........................ | 361/679.33 |
| 7,092,249 B2 * | 8/2006 | Wang | ........................ | 361/679.33 |
| 7,254,018 B2 * | 8/2007 | Zhang et al. | .............. | 361/679.33 |
| 7,489,504 B2 * | 2/2009 | Chen et al. | .............. | 361/679.37 |
| 7,495,903 B2 * | 2/2009 | Chen et al. | .............. | 361/679.31 |
| 7,697,279 B2 * | 4/2010 | Yeh et al. | ................. | 361/679.39 |
| 2003/0030992 A1 * | 2/2003 | Kim et al. | ...................... | 361/725 |
| 2008/0062635 A1 * | 3/2008 | Chang | .......................... | 361/685 |

* cited by examiner

Primary Examiner — Terrell McKinnon
Assistant Examiner — Michael McDuffie
(74) Attorney, Agent, or Firm — Altis Law Group, Inc.

(57) ABSTRACT

A hardware fastening structure for fastening hardware for computer includes a housing, a bracket, and a fixed frame. The housing includes a bottom plate. The bracket includes a first side-board. A first bolt is extended outward from and substantially perpendicular to the first side-board. The fixed frame includes a bottom board is positioned onto the bottom plate of the housing, and a back board substantially perpendicular to and adjacent to the bottom board. The back board defines a cambered guiding slot. The cambered guiding slot includes an arced sliding portion and a locating portion communicating with the sliding portion. The locating portion is above the sliding portion. The first bolt is inserted through the sliding portion, and is capable of sliding along the sliding portion until the first bolt is locked in locating portion to lift the bracket relative to the housing.

7 Claims, 4 Drawing Sheets

ND STRUCTURE FOR
HARDWARE FASTENING STRUCTURE FOR COMPUTER

BACKGROUND

1. Technical Field

The disclosure relates to hardware fastening structures for use in computers to stably hold and support a hard disk drive, a CD-ROM drive and so on.

2. Description of the Related Art

Hard disk drives and CD-ROM drives are very important components in computers for storing and accessing data. They must be stably mounted inside the housings of the computers to provide a stable work environment and correspondingly prolonging their lifespans. Generally, the hard disk drives and the CD-ROM drives are stacked on each other, and are fixed by a number of fasteners, resulting in time-consuming and difficult assembling and repairing processes.

Therefore, what is needed is to provide a hardware fastening structure which can overcome the disadvantage above mentioned.

BRIEF DESCRIPTION OF THE DRAWINGS

Many aspects of the present hardware fastening structure could be better understood with reference to the accompanying drawings. The components in the drawings are not necessarily drawn to scale, the emphasis instead being placed upon clearly illustrating the principles of the hardware fastening structure. Moreover, in the drawings, like reference numerals designate corresponding parts throughout the several views.

DETAILED DESCRIPTION

Embodiments of the present hardware fastening structure 100 will be now described in detail with reference to the drawings.

Figure 1:
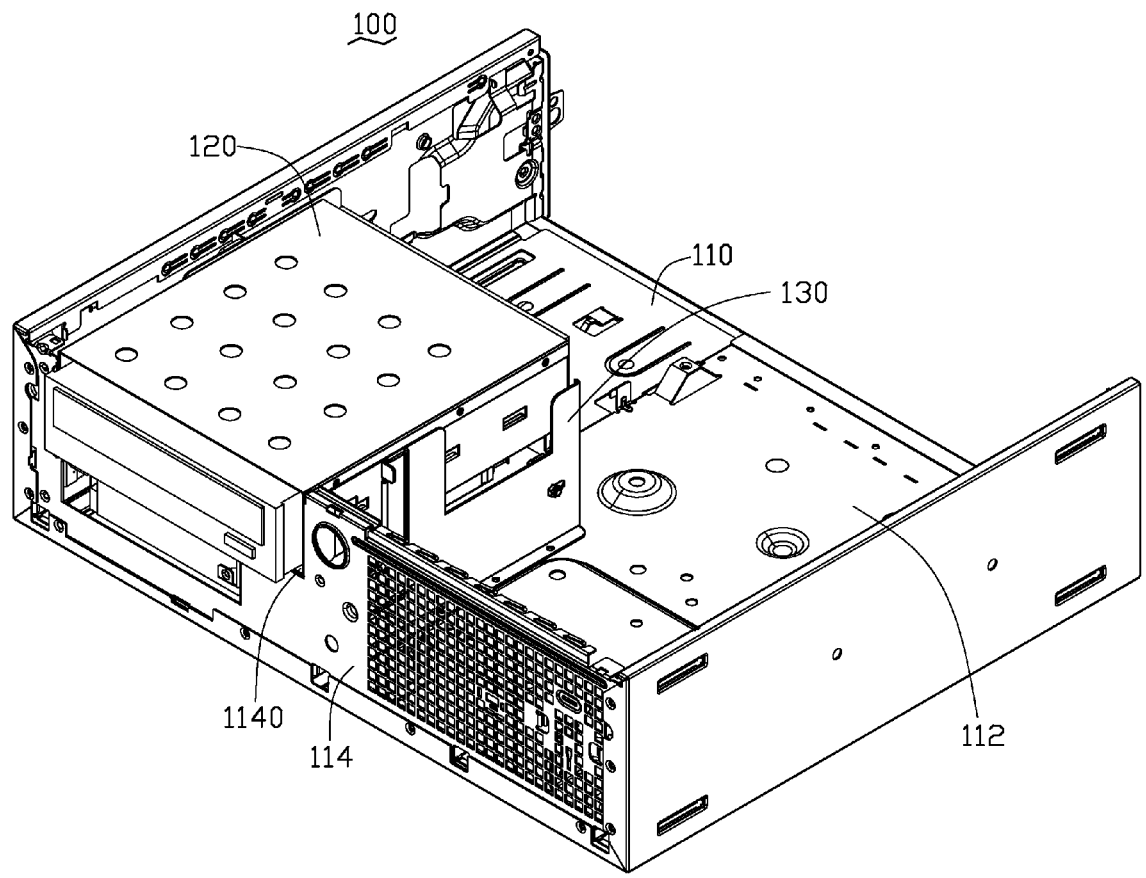
FIG. 1 is an assembled, isometric view of a hardware fastening structure, installed in a computer case, which includes a bracket, a fixed frame and a locking plate, according to an exemplary embodiment.
Figure 2:
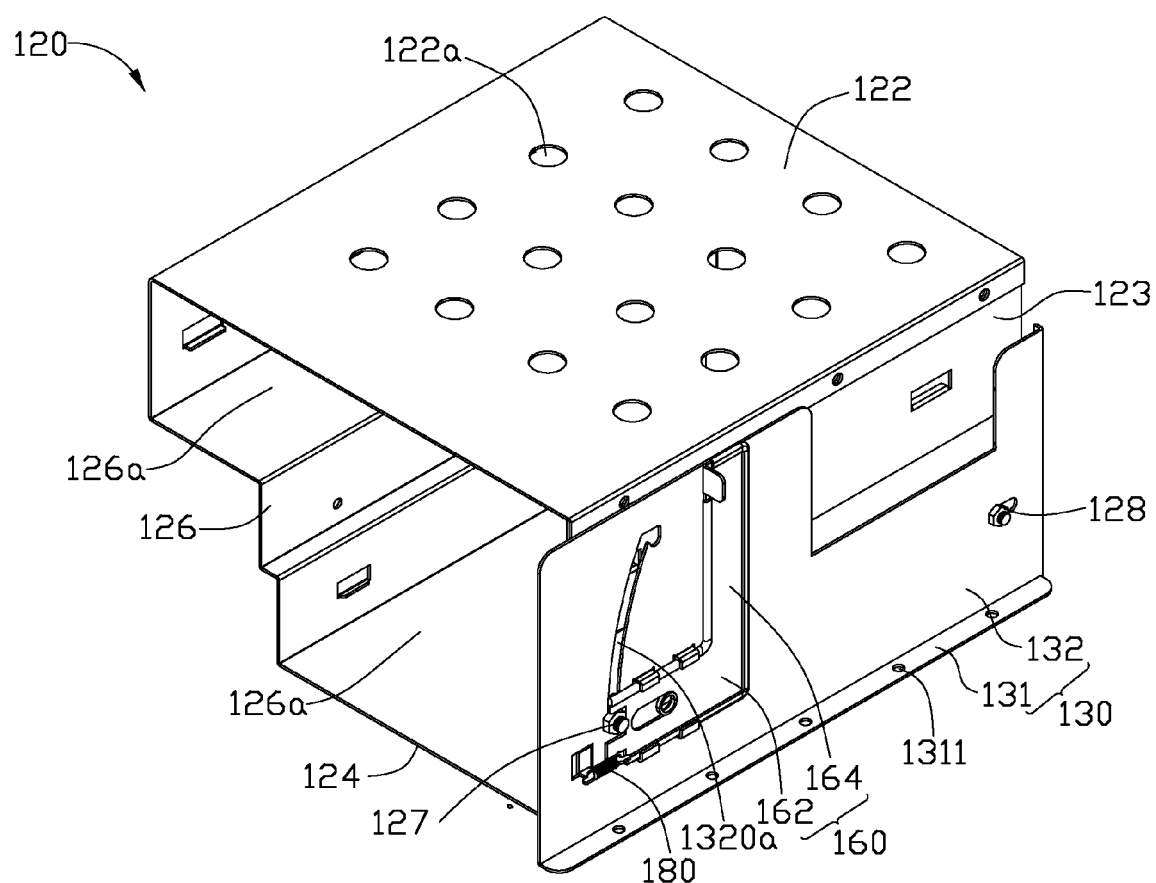
FIG. 2 is a partial, assembled, isometric view of the hardware fastening structure of FIG. 1.
Figure 3:
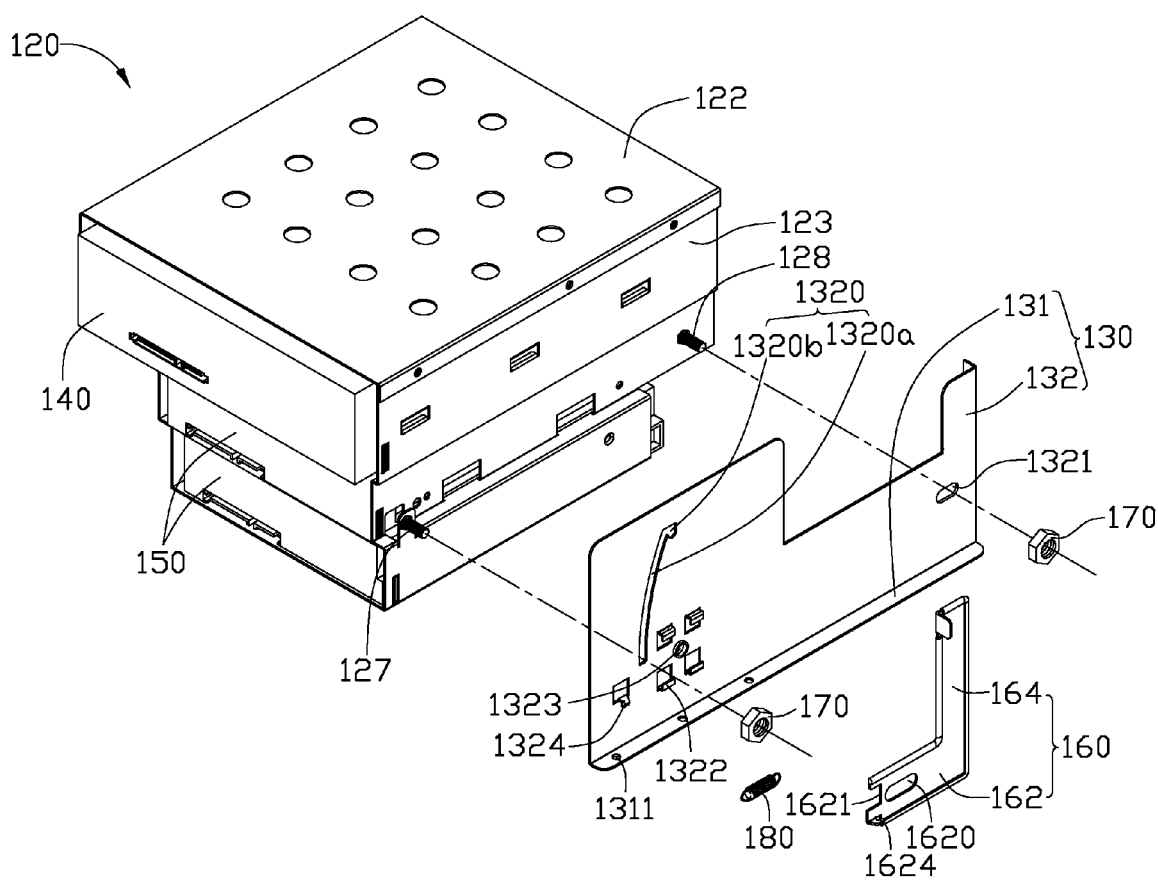
FIG. 3 is a partial, exploded, isometric view of the hardware fastening structure of FIG. 1.

Referring to FIGS. 1-3, a hardware fastening structure 100 according to an exemplary embodiment, is shown. The hardware fastening structure 100 includes a housing 110 of a computer, a bracket 120, a fixed frame 130, and a locking plate 160. The fixed frame 130 is fixed to the inside of the housing 110, and the bracket 120 is rotatably connected to the fixed frame 130. A CD-ROM drive 140 and a hard disk drive 150, as exemplary devices, are fixedly received in the bracket 120. The bracket 120 can be lifted relative to the fixed frame 130, and therefore to be lifted from the housing 110 to take out the CD-ROM drive 140 and the hard disk drive 150 from the bracket 120 or reload the CD-ROM drive 140 and the hard disk drive 150 into the bracket 120.

The housing 110 is a protective shell for receiving a series of different electrical elements of the computer therein. In the embodiment, the housing 110 includes a bottom plate 112 and a sidewall 114 perpendicularly extended from a periphery of the bottom plate 112. The sidewall 114 defines an opening 1140.

The bracket 120 includes an upper plate 122, a lower plate 124 parallel to the upper plate 122, a first side-board 123 substantially perpendicular to and connected to the upper plate 122 and the lower plate 124, and three separated side plates 126 perpendicularly interconnected with the upper plate 122 and the lower plates 124. The three separated side plates 126 face the first side-board 123. The upper plate 122 defines a number of apertures 122a therein for dissipating heat inside the bracket 120 to outside. Each of the side plates 126 is perpendicularly bent to form a series of stages 126a for separately supporting the CD-ROM drive 140 and the hard disk drive 150. A first bolt 127 and a second bolt 128 are respectively extended outward from and substantially perpendicular to the first side-board 123. The first bolt 127 and the second bolt 128 are positioned at the same level relative to the bottom of the first side-board 123 and spaced from each other by a distance. Both the first bolt 127 and the second bolt 128 are externally threaded.

The fixed frame 130 includes a bottom board 131 and a back board 132. The back board 132 is extended upward from and substantially perpendicular to the bottom board 131. The bottom board 131 defines a number of threaded holes 1311 for screwing the fixed frame 130 onto the bottom plate 112 of the housing 110. The back board 132 defines a cambered guiding slot 1320 and a first guiding slot 1321. The first guiding slot 1321 is configured for receiving the second bolt 128. The cambered guiding slot 1320 includes an arced sliding portion 1320a and a locating portion 1320b communicating with a distal end of the sliding portion 1320a. The locating portion 1320b is formed above the sliding portion 1320a. In this embodiment, the fixed frame 130 also includes four locking hooks 1322, a column 1323, and a first locating hook 1324. The four locking hooks 1322 are made of elastic material, and are positioned between the cambered guiding slot 1320 and the first guiding slot 1321 in a 2×2 matrix array. The column 1323 is positioned at the center of the 2×2 matrix array.

The locking plate 160 is a "L" shape, and includes a locking portion 162 and a handle portion 164. The locking plate 160 is configured for locking the bracket 120 onto the fixed frame 130. The locking portion 162 defines a second guiding slot 1620 corresponding to the column 1323 and a cutout 1621 adjacent to the second guiding slot 1620. A second locating hook 1624 is positioned below the cutout 1621.

The hardware fastening structure 100 further includes two nuts 170 and a spring 180. The nuts 170 are provided for being screwed onto the first bolt 127 and the second bolt 128 correspondingly. The first bolt 127 and the corresponding nut 170 are received in the cutout 1621 of the locking plate 160. The spring 180 is hooked between the first locating hook 1324 and the second locating hook 1624 at its ends correspondingly, and configured for giving the locking plate 160 a recover force when the locking plate 160 is pushed to disengage the first bolt 127 and the corresponding nut 170 from the cutout 1621 of the locking plate 160. In assembly, after the CD-ROM driver 140 and the hard disk drive 150 are respectively supported in the stages 126a of the bracket 120, the first bolt 127 is inserted through the sliding portion 1320a of the cambered guiding slot 1320, and the second bolt 128 is inserted through the first guiding slot 1321 of the back board 132. After that, the two nuts 170 are respectively screwed onto the first bolt 127 and the second bolt 128. The locking portion 162 of the locking plate 160 is clamped by the locking hooks 1322. The column 1323 is received in the second guiding slot 1620. The nut 170 is screwed onto the first bolt 127 and is received in the cutout 1621 together with the first bolt 127. The spring 180 is hooked between the first locating hook 1324 of the back board 132 and the second locating hook 1624 of the locking plate 160.

It should be mentioned that the number of the locking hooks 1322 are not limited by this description. In other alternative embodiments, the back board 132 can include two or more than four locking hooks 1322.

Figure 4:
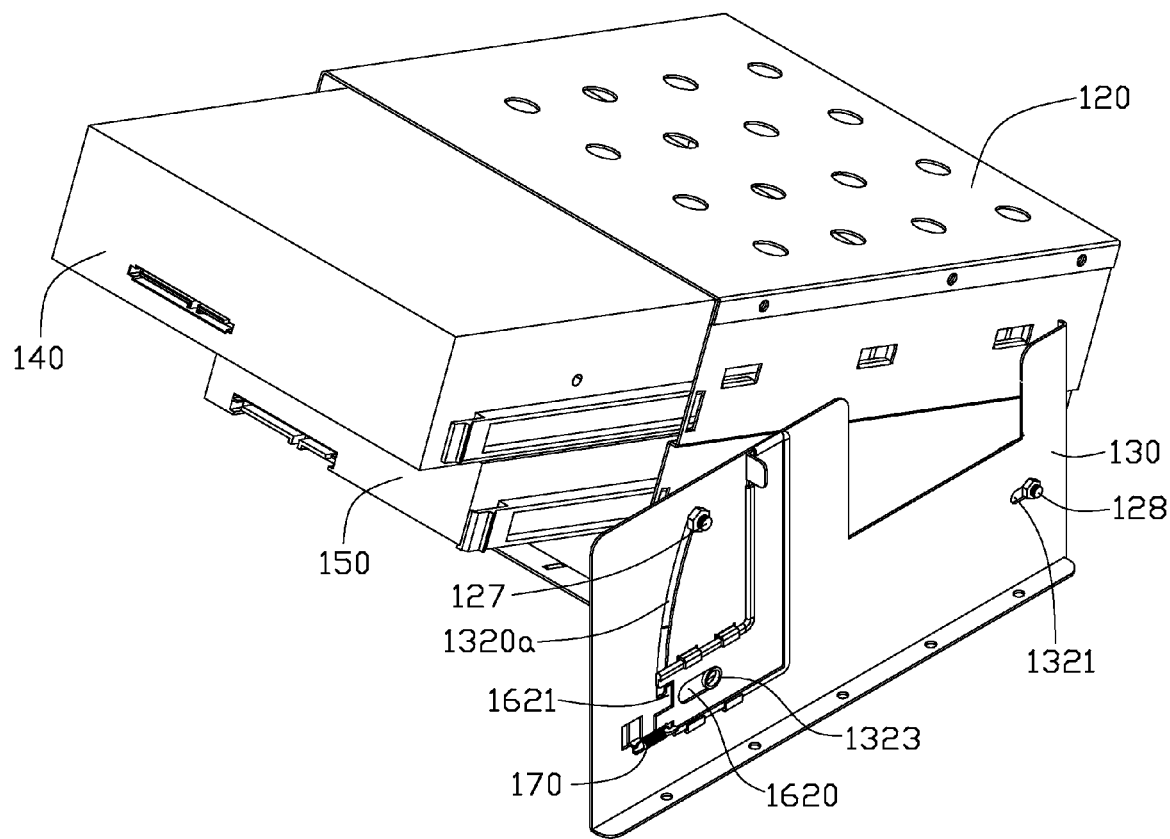
FIG. 4 is a partial, assembled, isometric view of the hardware fastening structure of FIG. 1, which shows the bracket is lifted relative to the fixed frame.

Referring to FIGS. 2 and 4, when to detach the CD-ROM driver 140 and/or the hard disk drive 150 from the bracket 120, it just needs to push the handle portion 164 of the locking plate 160 to disengage the first bolt 127 from the cutout 1621, and then to lift the bracket 120 from the opening 1140 relative to the fixed frame 130. With the lifting of the bracket 120, the first bolt 127 slides along the sliding portion 1320a of the cambered guiding slot 1320. The first bolt 127 is finally stopped at the locating portion 1320b, which limits the bracket 120 from being lifted further. At this position, the CD-ROM driver 140 and/or hard disk drive 150 can be taken out from the bracket 120.

As the description above, it is appreciated that the hardware fastening structure 100 is simple in structure and simplifies the assembling and detaching processes of the hardware such as hard disk drives 140 and CD-ROM drives 150 in the housing of a computer, thereby overcoming the disadvantage in related art.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A hardware fastening structure for fastening hardware for computer, comprising:
    a housing comprising a bottom plate;
    a bracket comprising an upper plate, a lower plate parallel to the upper plate, a first side-board substantially perpendicular to and connected to the upper plate and the lower plate, a first bolt extended outward from and substantially perpendicular to the first side-board, the first bolt screwed with a nut;
    a fixed frame comprising a bottom board positioned onto the bottom plate of the housing, a back board extended upwards from and substantially perpendicular to the bottom board, and at least two locking hooks located on the back board, the back board defining a cambered guiding slot and a first guiding slot, the cambered guiding slot comprising an arced sliding portion for receiving the first bolt and a locating portion communicating with a distal end of the sliding portion, the locating portion being positioned above the sliding portion relative to the bottom of the back board;
    a locking plate comprising a locking portion, the locking portion being clamped between the locking hooks and configured for engaging with the first bolt and locking the first bolt at an end of the sliding portion way from the locating portion; and
    a spring
    wherein, the first bolt is configured for sliding along the sliding portion when the locking plate is disengaged from the first bolt and the bracket is lifted relative to the housing, and being located in the locating portion at which position the hardware is allowed to be taken out from the bracket, the fixed frame also comprises a first locating hook and a second locating hook, the locking portion defines a second guiding slot and a cutout adjacent to the second guiding slot, the second locating hook is positioned below the cutout, the spring is hooked between the first locating hook and the second locating hook at its ends correspondingly, the first bolt and the corresponding nut are received in the cutout.

2. The hardware fastening structure as claimed in claim 1, wherein the at least two locking hooks comprises four locking hooks, and are positioned between the cambered guiding slot and the first guiding slots in a 2×2 matrix array, the fixed frame also comprises a column positioned at the center of the 2×2 matrix array, the column is positioned at the center of the 2×2 matrix array.

3. The hardware fastening structure as claimed in claim 1, wherein the locking hooks are made of elastic material.

4. The hardware fastening structure as claimed in claim 1, wherein the housing also comprises a sidewall perpendicularly extended from a periphery of the bottom plate, the sidewall defines an opening, the bracket can be lift in the opening relative to the bottom board of the fixed frame.

5. The hardware fastening structure as claimed in claim 1, wherein the upper plate defines a number of apertures.

6. The hardware fastening structure as claimed in claim 1, wherein a second bolt is extended outward from and substantially perpendicular to the first side-board, the first bolt and second bolt are positioned at the same level relative to the bottom of the first side-board and spaced from each other by a distance, the second bolt is inserted through the first guiding slot and screwed with a nut.

7. A hardware fastening structure for fastening hardware for computer, comprising:
    a housing comprising a bottom plate;
    a bracket comprising an upper plate, a lower plate parallel to the upper plate, a first side-board substantially perpendicular to and connected to the upper plate and the lower plate, a first bolt extended outward from and substantially perpendicular to the first side-board;
    a fixed frame comprising a bottom board positioned onto the bottom plate of the housing, a back board extended upwards from and substantially perpendicular to the bottom board, and four locking hooks located on the back board, the back board defining a cambered guiding slot and a first guiding slot, the cambered guiding slot comprising an arced sliding portion for receiving the first bolt and a locating portion communicating with a distal end of the sliding portion, the locating portion being positioned above the sliding portion relative to the bottom of the back board; and
    a locking plate comprising a locking portion, the locking portion being clamped between the locking hooks and configured for engaging with the first bolt and locking the first bolt at an end of the sliding portion away from the locating portion;
    wherein, the first bolt is configured for sliding along the sliding portion when the locking plate is disengaged from the first bolt and the bracket is lifted relative to the housing, and is located in the locating portion at which position the hardware is allowed to be taken out from the bracket, the locking hooks are positioned between the cambered guiding slot and the first guiding slots in a 2×2 matrix array, the fixed frame also comprises a column positioned at the center of the 2×2 matrix array, the column is positioned at the center of the 2×2 matrix array.

* * * * *